United States Patent
Robertson et al.

(10) Patent No.: US 7,233,628 B2
(45) Date of Patent: Jun. 19, 2007

(54) DATA TRANSMISSION

(75) Inventors: Iain Robertson, Bedford (GB); Richard Simpson, Bedford (GB); Michael Harwood, Rushden (GB); Richard Ward, Abington (GB); Andrew Joy, Northampton (GB); Robert Simpson, Buckingham (GB)

(73) Assignee: Texas Instruments Incorporated, Dallas, TX (US)

( * ) Notice: Subject to any disclaimer, the term of this patent is extended or adjusted under 35 U.S.C. 154(b) by 769 days.

(21) Appl. No.: 10/624,699

(22) Filed: Jul. 22, 2003

(65) Prior Publication Data

US 2004/0052322 A1   Mar. 18, 2004

(30) Foreign Application Priority Data

Jul. 22, 2002   (EP) .................................. 02255101

(51) Int. Cl.
   *H04B 7/24*   (2006.01)
(52) U.S. Cl. ...................................................... 375/295
(58) Field of Classification Search ................ 375/295, 375/371, 362; 341/100, 106
   See application file for complete search history.

(56) References Cited

U.S. PATENT DOCUMENTS 6,018,305 A * 1/2000 Kikuchi et al. ............. 341/100
6,239,629 B1   5/2001 Erickson
7,035,368 B2 * 4/2006 Pickering et al. ........... 375/376
2002/0094047 A1   7/2002 Agazzi

FOREIGN PATENT DOCUMENTS

EP   0 996 262 A1   4/2000
EP   1 385 306 A1   1/2004

* cited by examiner

*Primary Examiner*—Khai Tran
(74) *Attorney, Agent, or Firm*—Alan K. Stewart; W. James Brady; Frederick J. Telecky, Jr.

(57) ABSTRACT

A circuit for receiving multiple serial datastreams in parallel is disclosed. A bit clock is recovered from each data stream, there being one data bit for each transition of the clock signal both positive and negative going. The phases of the bit clocks are compared and are adjusted by 180 degrees so that the positive going edges of all occur close to each other. The bits of each stream are assembled into words under the control of a word clock. In one embodiment a common word clock is derived form the set of bit clocks as a whole. In another embodiment each stream is provided with its own word clock which is aligned to positive edges of the respective bit clocks that are close to each other.

26 Claims, 9 Drawing Sheets

DATA TRANSMISSION

FIELD OF THE INVENTION

The present invention relates to the transmission of data and more particularly to the transmission of a number of serial data streams in parallel.

BACKGROUND OF THE INVENTION

FIG. 1 shows a differential driver 1 that takes a differential input on conductors 2 and 3 and converts that input into a serial data stream on an output conductor 4.

It is known to use the differential driver 1 of FIG. 1 as an input stage to a digital system, but other circuits for that purpose are known. It is also known to generate a clock signal for the digital system from an input data stream (i.e. on the output 4 of the differential driver 1 in the case of FIG. 1). Such clock recovery is especially effective when the data changes frequently as this makes it easier to determine where the clock pulses should be positioned.

FIG. 2 shows a single data stream and an associated clock signal. The clock signal shown in FIG. 2 samples the data on both the rising and falling clock edges and the clock transitions are closely aligned with the mid-point between data transitions. Such alignment is preferable as the data is given the maximum time both before and after the clock transition in which to be stable. This gives the best chance of the set-up and hold times of subsequent circuits not being violated.

One method of achieving such clock alignment uses the circuit of FIG. 3. A phase locked loop (PLL) 5 is shown with an input 7 receiving a reference clock signal at the required frequency (or a sub-multiple of the required frequency). The PLL generates a number of clock outputs 8 (8 in the example of FIG. 3) each at a difference phase (spaced apart by 45 degrees in the example of FIG. 3). The clock signal can be placed close to the mid-point between the data transitions by selecting the most appropriate clock signal from the output 8 of the PLL 7.

Another method of determining the optimum clock signal is illustrated by FIGS. 4 and 5. FIG. 4 shows a phase wheel with 8 phase signals indicated, representing the eight phases of the PLL output 8. Those phase signals are plotted at 0, 45, 90, 135, 180, 225, 270 and 315 degrees respectively. The phase of data stream relative to a reference signal (for example, relative to a reference clock input) can be plotted on the phase wheel. Once the phase of data stream is "plotted" on the wheel, the outputs 8 of the PLL that are located either side of the data stream can be identified.

FIG. 5 is a block diagram of a circuit for generating the appropriate clock signal. The output of the differential driver 1 is passed to a phase detector 9 that determines the phase of the data (for example, with reference to the phase of the generated clock signal). Phase detector 9 stores the phase value and this is output to a phase interpolator 10 along with the eight clock signals from the PLL 7. A clock signal is generated by selecting the two phase signals from the PLL 7 between which the phase of the data stream falls and using the phase interpolator to generate a clock signal with a phase between those two clock signals. A typical phase interpolator may generate the most appropriate clock phase between those phase inputs from 16 possibilities. Thus the phase wheel can be divided into 16×8 (i.e. 128) clock phases.

The incoming data stream may be at a high frequency; in one optic fibre application the data rate is 3.2 Gb/s. A clock is recovered at 1.6 GHz and samples the data on both the rising and falling edges of the recovered clock signal (as shown in FIG. 2). It is preferable to have a clock signal that samples data on both the rising and falling edges only since a clock that sampled on the rising edge only would have to be at twice the frequency; this would double the power required by the circuit and double the noise present, which at those frequencies would be a practical limitation. Data sampled on the rising edge of the bit clock is termed "even" data and data sampled on the falling edge is termed "odd" data.

SUMMARY OF THE INVENTION

There are difficulties, the inventors have realised, with applying a circuit such as that of FIG. 5 to plural serial data streams in parallel.

The present invention has three main aspects, each of which are claimed in a separate patent application. All three aspects are set out below.

According to a first aspect of the invention there is provided a circuit comprising:

a plurality of data input terminals each for receiving respective serial data signals having the same bit rate, bit clock generating means responsive to the serial data signals to provide for each a respective bit clock signal aligned with that data signal and having a period equal to twice the bit period of the data signal, bit clock phase adjustment means responsive to the relative phases of the bit clocks to adjust the phases of the bit clocks relative to one another so that they all lie within a common interval of 180° of phase, where 360° of phase represents the period of the bit clock.

The plurality of bit clocks may comprise a master one, the others of the plurality being slave ones. The bit clock phase adjustment means may be arranged to compare the master bit clock signal with the phase of the other or each of the other, slave, bit clock signals and to adjust the phase of the or each slave bit clock signal if it falls outside the common interval of 180° of phase. The adjustment means may be such that the common interval is defined with respect to the phase of the master bit clock. The common interval may be centred on the phase of the master bit clock.

The phase adjustment means may be arranged to adjust the phase of a bit clock signal that is outside the common interval to a phase that is defined with respect to the phase of the or a master one of the bit clock signals and that is within the common interval. The phase adjustment means may be arranged to adjust the phase of a bit clock signal that is outside the common interval to be equal to the phase of the master bit clock signal. The bit clock generating means may be arranged to re-align a bit clock signal to its associated serial data signal after the said adjustment of the phase.

The phase adjustment means may be arranged to adjust, by 180°, the phase of a bit clock signal outside the common interval. The circuit may comprise an inverter connected to be switched in or out of the path of a bit clock signal to perform the said 180° phase adjustment.

A separate bit clock generating means may be provided for each bit clock signal of the plurality. The bit clock phase adjustment means may be provided as a centralised unit connected to receive from each separate bit clock generating means a signal representing the phase of its bit clock signal and to send to at least some of the separate bit clock generating means signals indicating that an adjustment of the phase of its bit clock signal is to be made. One of the separate bit clock generating means may provide a master phase, the centralised bit clock phase adjustment means may be arranged to compare each of the phase signals from the other separate bit clock generating means with the master phase, and the centralised bit clock phase adjustment means may be connectable to all of the separate bit clock phase adjustment means except the master one to provide them with signals indicating that an adjustment of phase is to be made. The separate bit clock generating means, or the said at least some of those, may each comprise an inverter connected to be switched in or out of the path of the bit clock signal to perform a 180° phase adjustment on its bits clock signal.

A separate bit clock generation means may be provided for each bit clock signal of the plurality and a separate slave bit clock phase adjustment means may be provided for all but a master one of the bit clock signals of the plurality, the slave bit clock phase adjustment means each being connected to receive the phase signal from the bit clock generation means of the master bit clock signal and being responsive thereto to adjust the phase of its bit clock signal.

The bit clock phase adjustment means, or each said separate bit clock phase adjustment means, may comprise a phase comparator for performing the said comparison of the phases of the bit clocks. The phase comparator may comprise a digital circuit responsive to digital signals representing the phases of the bit clock signals to perform the said comparing the phases of the bit clocks.

The bit clock generating means, or each said bit clock generating means may comprise a phase selector operative to store a digital phase value representing the phase of a bit clock signal, means responsive to that digital phase value to generate a bit clock signal of a corresponding phase.

The bit clock generating means may comprise an early/late detector operative to compare the phases of the bit clock and its associated data signal and to adjust the value stored in the phase selector so as to keep the bit clock in a particular phase relationship with its associated data signal.

The bit clock phase adjustment means may be operative to effect the said adjustment of the phase of the bit clock by adjusting the value in the phase selector.

The first aspect of the invention also provides a method receiving a plurality of parallel data signals of the same bit rate comprising:

generating for each data signal a respective bit clock signal aligned with that data signal and having a period equal to twice the bit period of the data signal, and adjusting the phases of the bit clocks relative to one another so that they all lie within a common interval of 180° of phase, where 360° of phase represents the period of the bit clock.

The method may comprise:

designating one of the said bit clocks as a master bit clock and the others as slave bit clocks, comparing the phase of each of the slave bit clocks with that of the master bit clock, and in response to that, adjusting each slave bit clock that falls outside said common interval of 180° of phase.

The common interval may be defined with respect to the phase of the master bit clock. The common interval may be centred on the phase of the master bit clock.

The adjusting of the phase of a bit clock signal that is outside the common interval may be to a phase that is defined with respect to a, or the, master one of the bit clock signals and that is within the common interval. The adjusting of the phase of a bit clock signal that is outside the common interval may be to a phase equal to that of the master bit clock signal. The method may comprise re-aligning a bit clock signal to its respective data signal after the said adjusting of the phase.

The adjusting of a bit clock signal outside the common interval may be by 180°.

The generating and adjusting of the bit clock signals may take place in separate units associated with the respective bit clock signals and the comparing may be performed for all of the bit clock signals in a centralised unit that signals the separate units when to adjust the phase of the bit clock signals.

The generating and adjusting of the bit clock signals may take place in separate units for each and the said comparing for a bit clock signal may be performed in its unit also, each unit receiving the master bit clock signal for that comparing.

In a second aspect of the invention there is provided a circuit comprising:

a plurality of data input terminals each for receiving respective serial data signals having the same bit rate, bit clock generating means responsive to the serial data signals to provide for each a respective bit clock signal, and a plurality of word forming means each connected to receive the bits of a respective one of the serial data signals for forming those bits into words and outputting the bits of those word in parallel, wherein the circuit further comprises a common word clock generating means for providing a common word clock in response to the phases of the said bit clock signals, and each of the plurality of word forming means is so responsive to the common word clock signal to provide its words aligned to the common word clock.

The word clock generating means may comprise a representative phase calculator for providing a phase signal representative of the phases of the plurality of bit clock signals, and the word clock generating means may be arranged to generate the common word clock so as to have the phase indicated by the representative phase signal or a phase derived therefrom. The word clock generating means may be arranged to add, or subtract, an offset to the representative phase signal and to generate the common word clock so as to have the phase indicated by the result of that addition or subtraction.

Each word forming means may comprise a shift register connected to receive serially the bits of the respective data signal and to shift them along the shift register in response to the respective bit clock signal. Each said shift register may comprise two component shift registers connected to receive the bits of the data signal alternately. The word forming means may comprise register connected to latch bits from the shift register in parallel in response to the common word clock signal.

The second aspect of the invention also provides a method receiving a plurality of serial data signals having the same bit rate comprising:

generating in responsive to the serial data signals a respective bit clock signal for each, and forming bits of each serial data signal into parallel words, wherein the method comprises providing a common word clock in response to the phases of the said bit clock signals, and the forming of the bits into words provides those words aligned to the common word clock.

The method may comprise calculating a phase signal representative of the phases of the plurality of bit clock signals, generating the common word clock so as to have the phase indicated by the representative phase signal or a phase derived therefrom.

The method may comprise adding, or subtracting, an offset to the representative phase signal and generating the common word clock so as to have the phase indicated by the result of that addition or subtraction.

A third aspect of the invention provides a clock alignment circuit comprising:

an input for receiving a first clock signal;

an input for receiving a second clock signal having a period N times that of the first clock signal, N being an integer greater than or equal to two;

an output for outputting a third clock signal also having a period N times that of the first clock signal;

phase comparison means for providing an indication of whether the closest edge of a particular kind of the first clock signal to an edge of a particular kind of the second clock signal is earlier or later than that edge, the said kinds of edges being positive going or negative going and the said ones of the first and second clock signals being of the same kind or of different kinds; and third clock signal providing means, for providing the third clock signal from the second clock signal, comprising latching means, for latching the second clock signal, operable to latch and delay the second clock signal by such an amount, dependent on the said indication from the phase comparison means, that the resulting third clock signal has an edge, either positive or negative going, aligned with the said closest edge of the first clock signal.

The latching means may comprise a first latch responsive to the first clock signal to latch the second clock signal, or a delayed version thereof, on a particular kind of edge of the first clock signal, and a second latch responsive to the first clock signal to latch the second clock signal, or a delayed version thereof, on the other kind of edge of the first clock signal, the third clock signal providing means being arranged to use the output of the first latch in the provision of the third clock signal if said indication from the phase comparison means is that the said edge is late and to use the output of the second latch if it is early. The circuit may comprise a multiplexer responsive to said indication to select between the outputs of the first and second latches or delayed versions thereof.

The latching means may comprise at least one further latch connected to latch, and thereby delay, the output of the first or second latch at times defined by the first clock signal. The latching means may comprise at least one further latch connected to latch, and thereby delay, the second clock signal, or a delayed version thereof, at times defined by a fourth clock signal, and to pass that delayed second clock signal to the first and second latches, the fourth clock signal having a period of 1/M times that of the second clock signal and having edges aligned with said particular kind of edge of the second clock signal.

N may equal M.

The latching means may provide a version of the second clock signal to the first and second latches so delayed that an edge of that version of the second clock signal falls substantially at a position at an interval equal to one period of the first clock signal before the said edge of said particular kind of the second clock signal.

The phases of the first clock signal and a, or the, fourth clock signal may have a period of 1/M times that of the second clock signal and have edges aligned with said particular kind of edge of the second clock signal, to produce said indication.

The third clock signal providing means may comprise an oscillator for generating the third clock signal, and phase adjustment means may be responsive to the delayed second clock signal provided by the latching means to adjust the phase of the third clock signal generated by the oscillator. The oscillator may comprise a counter.

The phase adjustment means may comprise an edge detector connected to detect an edge of a particular kind in the delayed second clock signal provided by the latching means.

The third aspect of the invention also provides a circuit for adjusting the phase of a plurality of word clocks for a respective plurality of data streams having a respective plurality of bit clocks, the bit clocks each having edges aligned with the bits of the respective data stream and the word clocks each having a period that is an integer multiple of that of the respective bit clock, the circuit comprising a plurality of phase adjustment circuits, each for so producing the word clock for a respective one of the data streams in response to a word clock for another one of the data streams and the bit clock for its own data stream that the word clock produced has an edge of a particular kind aligned with the edge of a particular kind of the bit clock for its own data stream that is closest to an edge of a particular kind of the word clock for the said other data stream, wherein one of the data streams is a master data stream and the circuit comprises means for producing the word clock for that data stream from its bit clock without reference to the phase of the word clocks of the other data streams.

At least some of the phase adjustment circuits may be connected in daisy-chain fashion with the first of those connected to receive the word clock for the master data stream and subsequent ones being connected to receive the word clock from the previous one.

Two or more of the phase adjustment circuits may be connected to receive the word clock for the master data stream.

Each phase adjustment circuit may be a clock adjustment circuit described above, each connected so that the first clock signal is the bit clock signal for the data stream of that phase adjustment circuit, the second clock signal is the word clock signal for said other data stream and the third clock signal is said word clock signal for the data stream of that phase adjustment circuit.

The third aspect of the invention further provides a method of aligning a second clock signal to a first clock signal, the second clock signal having a period N times that of the first clock signal, N being an integer greater than or equal to two, to provide a third clock signal also having a period N times that of the first clock signal, the method comprising:

providing an indication of whether the closest edge of a particular kind of the first clock signal to an edge of a particular kind of the second clock signal is earlier or later than that edge, the said kinds of edges being positive going or negative going and the said ones of the first and second clock signals being of the same kind or of different kinds; and providing the third clock signal from the second clock signal, that providing comprising latching, and thereby delaying, the second clock signal by such an amount, dependent on the said indication that the resulting third clock signal has an edge, either positive or negative going, aligned with the said closest edge of the first clock signal.

The latching may comprise latching the second clock signal, or a delayed version thereof, in response to the first clock signal on a particular kind of edge of the first clock signal and latching the second clock signal, or a delayed version thereof, in response to the first clock signal on the other kind of edge of the first clock signal, wherein the one of those latched versions of second clock signal that is used in the providing of the third clock signal is selected in response to said indication of whether the said edge is late or early.

The latching may further comprise latching, and thereby delaying, the second clock signal, or a delayed version thereof, at times defined by a fourth clock signal, and passing that delayed second clock signal to be the version of the second clock signal latched on both kinds of edge of the first clock signal, the fourth clock signal having a period of 1/M times that of the second clock signal and having edges aligned with said particular kind of edge of the second clock signal.

N may equal M.

The latching may provide such a version of the second clock signal for the latching on both kinds of edge of the first clock signal that an edge of that version of the second clock signal falls substantially at a position at an interval equal to one period of the first clock signal before the said edge of said particular kind of the second clock signal.

The said indication may be provided in response to the first clock signal and a, or the, fourth clock signal having a period of 1/M times that of the second clock signal and having edges aligned with said particular kind of edge of the second clock signal.

The providing of the third clock signal may comprise generating the third clock signal with an oscillator, and adjusting the phase of the third clock signal so provided in response to the delayed second clock signal provided by the latching. The adjusting may comprise edge detecting an edge of a particular kind in the delayed second clock signal provided by the latching.

The third aspect of the invention also provides a method adjusting the phase of a plurality of word clocks for a respective plurality of data streams having a respective plurality of bit clocks, the bit clocks each having edges aligned with the bits of the respective data stream and the word clocks each having a period that is an integer multiple of that of the respective bit clock, the method comprising using a plurality of phase adjustment circuits, each for so producing the word clock for a respective one of the data streams in response to a word clock for another one of the data streams and the bit clock for its own data stream that the word clock produced has an edge of a particular kind aligned with the edge of a particular kind of the bit clock for its own data stream that is closest to an edge of a particular kind of the word clock for the said other data stream, wherein one of the data streams is a master data stream and the circuit comprises means for producing the word clock for that data stream from its bit clock without reference to the phase of the word clocks of the other data streams.

At least some of the phase adjustment circuits may be connected in daisy-chain fashion with the first of those connected to receive the word clock for the master data stream and subsequent ones being connected to receive the word clock from the previous one.

Two or more of the phase adjustment circuits may be connected to receive the word clock for the master data stream.

Each phase adjustment circuit may be a clock adjustment circuit as described above, each connected so that the first clock signal is the bit clock signal for the data stream of that phase adjustment circuit, the second clock signal is the word clock signal for said other data stream and the third clock signal is said word clock signal for the data stream of that phase adjustment circuit.

BRIEF DESCRIPTION OF THE DRAWINGS

Embodiments of the various aspects of the invention will now be described, by way of example only, with reference to the accompanying drawings, of which.

DETAILED DESCRIPTION OF PREFERRED EMBODIMENTS

Figure 6:
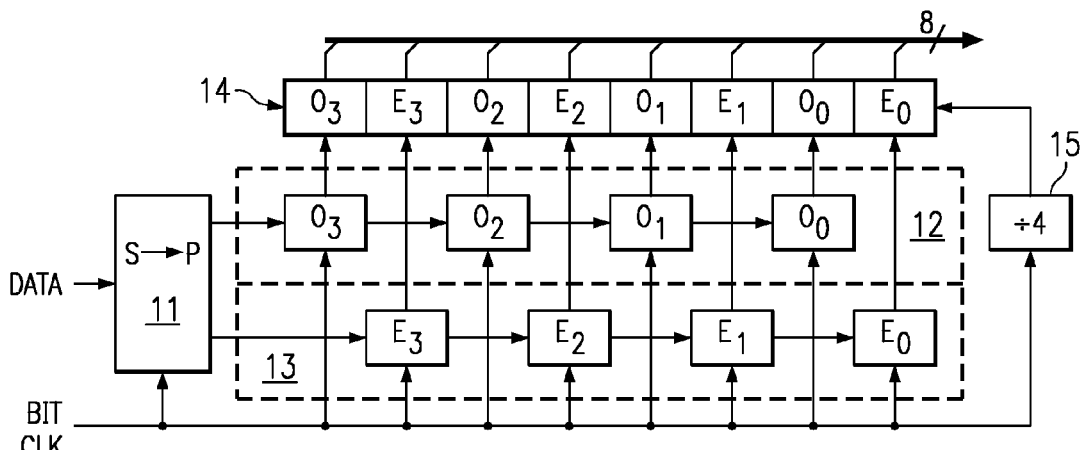
FIG. 6 is a block diagram showing the generation of the data words in the present invention.

FIG. 6 shows a basic circuit used in the invention for receiving a single serial data stream.

The incoming data is converted into a two-bit parallel word by a serial to parallel converter 11 that is clocked on the rising and falling edges of the bit clock. One of the output bits of the serial to parallel converter 11 carries the even data and the other bit carries the odd data.

The odd and even data bits are respectively shifted into shift registers 12 and 13 as shown in FIG. 6. Shift registers 12 and 13 are clocked by the bit clock but on the rising edge only. When the shift registers 12 and 13 are full, the odd and even data words are combined to produce a single data word in register 14. In the example of FIG. 6, 8-bit data words are produced and are sampled on the rising edge of a byte clock signal that is ¼ of the frequency of the bit clock. The byte clock is generated at the output of a divide-by-four circuit 15, the input of which is provided by the bit clock. Thus, in the example given above, the 1.6 GHz bit clock is reduced to generate a 400 Mhz byte clock to clock register 14.

Figure 7:
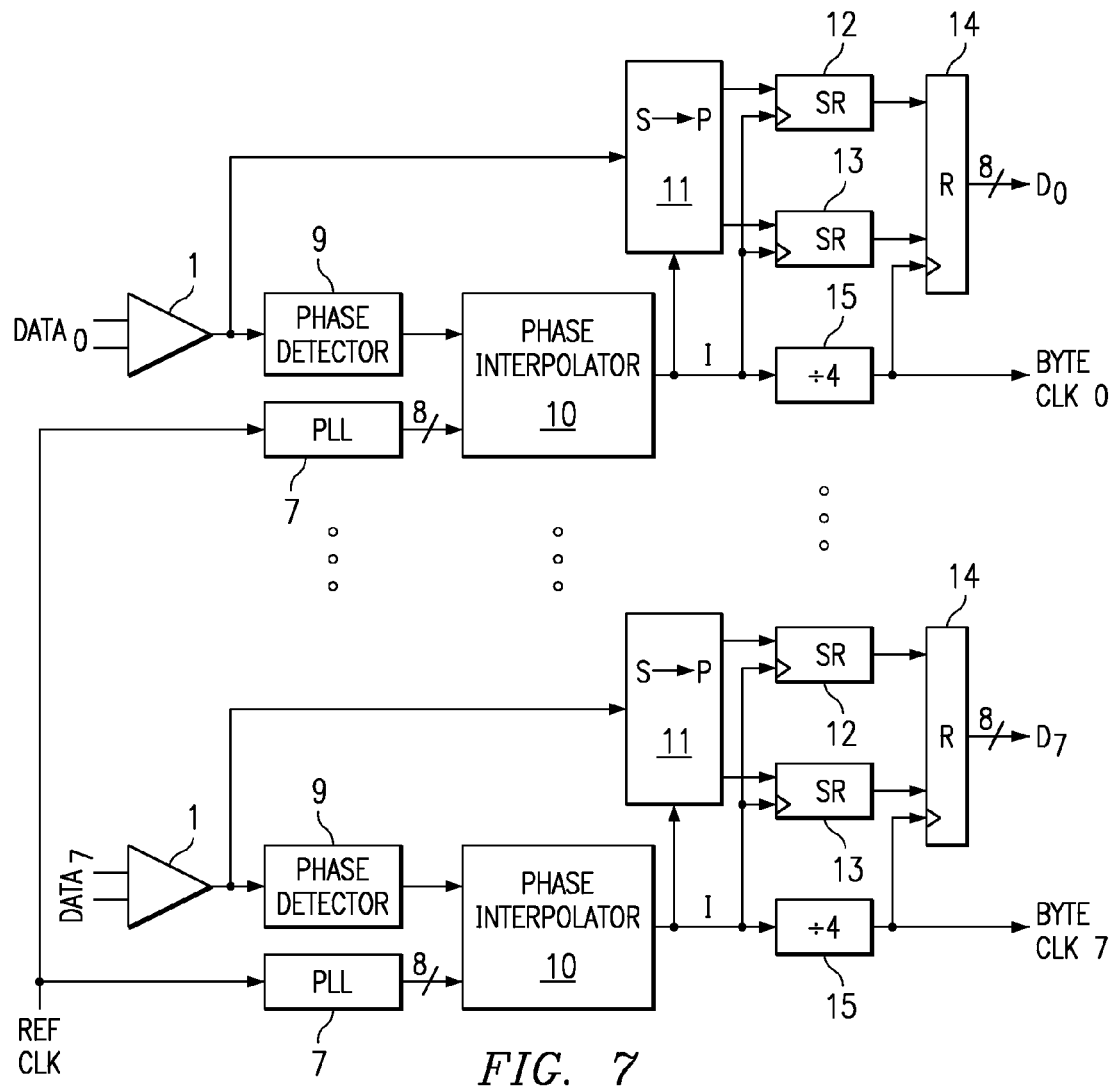
FIG. 7 is a block diagram of a circuit for receiving a parallel data link in accordance with the present invention.

In the preferred embodiment a plurality of data streams are derived from a plurality of differential inputs. A suitable circuit is shown in block diagram form in FIG. 7. FIG. 7 shows a first section for converting a serial data stream DATA0 into parallel data D0. That sub-circuit consists of the elements of FIGS. 5 and 6. As in FIG. 5, the output of the differential driver 1 is passed to a phase detector 9 that determines the phase of the data. The output of the phase detector 9 is passed to a phase interpolator 10 along with the eight clock signals from the PLL 7. A clock signal is generated by the phase interpolator 10 as discussed above. The output of the differential driver 1 is converted into a two-bit parallel word by a serial to parallel converter 11 that is clocked on the rising and falling edges of the bit clock. One of the output bits of the serial to parallel converter 11 carries the even data and the other bit carries the odd data. The odd and even data bits are respectively shifted into shift registers 12 and 13, those shift registers being clocked on the rising edge only of the bit clock. When the data registers are full, the odd and even data words are combined to produce a single data word in register 14 that is clocked by the byte clock which is generated by the divide-by-four circuit 15.

The circuit of FIG. 7 includes 8 data channels, only two of which are shown. Each of the data channels includes identical circuit elements as for the channel discussed above.

Each data stream generates its own clock signal from the data of that data stream and thus the system has eight parallel data streams with eight unsynchronised bit clock signals (and also therefore eight unrelated byte clock signals).

A problem associated with the regeneration of the clock signals is that sampling the data on both the rising and falling edges gives rise potentially to the anti-phase bit clocks. This is explained with reference to FIG. 8.

The incoming data is shown with two possible bit clocks CLK A and CLK B that could be generated by the system (i.e. by the circuit of FIG. 5) to sample that data. Indeed, the circuit of FIG. 5 in obtaining a lock on the data stream settles on one or other of the clock phases unpredictably. The clocks are 180° apart. Although the two clock signals both generate valid data, the phase affects which bits of the data become odd data and which even.

The identity of the bits of data as even and odd is important. For example, consider a stream of bits B0 to B8 (B0 transmitted first).

If B0 is latched as an even bit and B1 as an odd bit, then the odd and even registers are filled as follows (CLK A).

| Odd: | B7 B5 B3 B1 |
|---|---|
| Even: | B6 B4 B2 B0 |

When the odd and even registers are combined on latching into register 14 under the control of the byte clock, the following data word is produced:

B7 B6 B5 B4 B3 B2 B1 B0

Because the bytes are latched on the rising edge of the byte clock, that rising edge coincides with a rising edge of the bit clock.

Alternatively, if B1 is latched as an even bit (CLK B) then the odd and even registers are filled as follows:

| Odd: | B8 B6 B4 B2 |
|---|---|
| Even: | B7 B5 B3 B1 |

Therefore producing the following data word:

B8 B7 B6 B5 B4 B3 B2 B1

Figure 5:
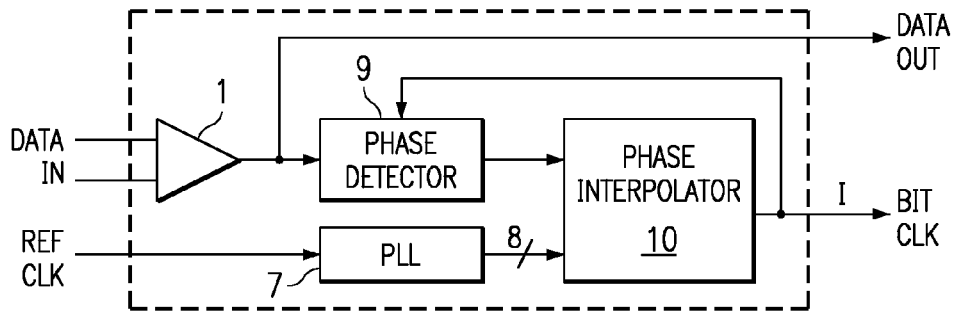
FIG. 5 is a circuit demonstrating a method of obtaining an optimum clock signal.

Thus for the same data stream the bit clock produced by the circuit of FIG. 5 may settle at one of two phases and these phases result in one bit difference in where the circuit of FIG. 5 draws a boundary between bytes in the data stream. At this stage in the circuit it is not known where the original byte boundaries were before the data was transmitted; restoring those is left to further circuitry downstream of the present invention. In some applications the difference of one bit in where this arbitrary byte boundary is drawn may not be important. It is important, however, in the application for which the present invention was developed. In that application the data streams (e.g. D0 to D7 in FIG. 5) only have a small phase difference between them, typically there being less than ¼ of a bit period difference between all of them and circuitry down stream of the present invention is responsible for turning the bytes produced by the circuit of FIG. 5 back into the original data. In the application the sequence of bits of the original data in the data streams is, however, arranged across the data streams as follows: a first bit is in one stream DATA 0, the next bit is transmitted at the same time in the next stream DATA 1, the next bit in the next stream DATA 2 again at the same time and so on until all the streams up to and including DATA 7 have a bit; the next bit is then in the next bit period of the first stream DATA 0 and so on. The circuit down stream of the present invention which reassembles the bits into their original order assumes that a set of bytes (one from each of the streams) provided by the present invention have bits that were transmitted at the same time at the same positions within those bytes. The preferred embodiment of the present invention eliminates the one bit period uncertainty caused by there being two phase possibilities for the bit clock as is explained below.

Another problem with the generation of independent bit clocks is with the generation of the byte clocks. The system is preferably to present 8-bit words in parallel at the output of the system, with those words synchronised to a single byte clock. The circuits described so far, however, have described the generation of a separate independent byte clock from each word.

The problem of anti-phase clocks is solved in a first embodiment of the present invention, by specifying one of the channels as having the master bit clock and aligning each of the generated bit clock signals to that master bit clock.

Figure 1:
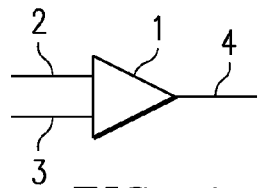
FIG. 1 shows a known differential driver that takes a differential signal and coverts it into a single-ended serial data stream.
Figure 2:
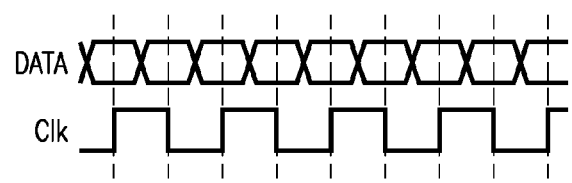
FIG. 2 shows a data stream generated by the circuit of FIG. 1 and an associated clock signal.
Figure 3:
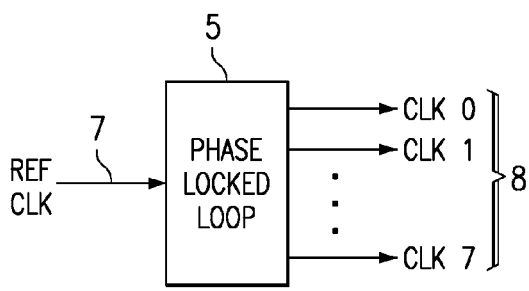
FIG. 3 is a phase-locked loop generating multiple phase clock signals from a single reference clock source.
Figure 4:
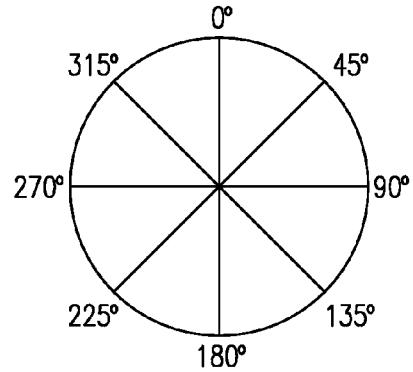
FIG. 4 shows a phase wheel.

Refer to the phase wheel of FIG. 4 and assume that the master channel produces a bit clock with a relative phase of 0° so that the phase of all of the generated bit clocks can be plotted on the phase wheel relative to the phase of the bit clock of the master channel. As discussed above, the phase of any generated bit clock relative to the master bit clock could in general be at any point around the phase wheel. This is because each of the bit clocks is generated independently with reference only to the data stream in that channel.

Figure 8:
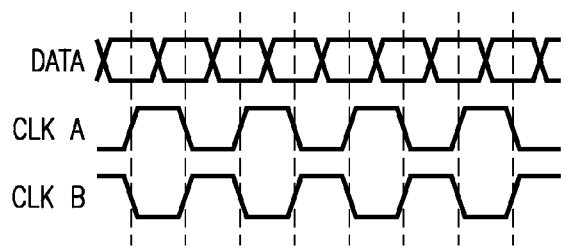
FIG. 8 shows the generation of two clock signals in anti-phase for a particular data stream.

In order for the anti-phase bit clock problem of FIG. 8 to be avoided, all of the bit clock signals should, the inventors have realised, be within the same half of the phase wheel of FIG. 4 (taking, for example, 0° to be the phase of a particular one of the bit clocks). In accordance with this embodiment of the invention, if the master clock is at 0°, all of the bit clocks must be in the upper half of that phase wheel (i.e. between 270° and 90°, which is an interval of 180° of phase of the bit clock signal).

Figure 9:
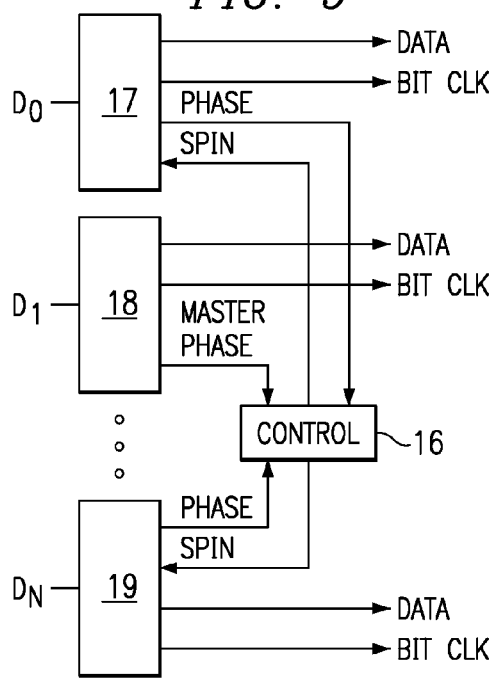
FIG. 9 shows a first circuit in accordance with the invention for setting the bit clocks of multiple channels.

In the application mentioned above where the phases of the data signals are within a ¼ bit period of each other the bit clocks will initially each settle to somewhere in the interval of 90° centred on 0° on the phase wheel or into an interval of 90° centred on 180° on the phase wheel. (In terms of the clocks shown in FIG. 8 the clocks near 0° on the phase wheel appear like CLKA and those near 180° will appear like CLKB or vice versa. On the phase wheel a ¼ of a bit period is an interval of 45°, which means that the clocks near 0° will be spanned by a common interval of not more than 45° and those near 180° will be spanned by a corresponding 45° common interval.) FIG. 9 shows a block diagram of a circuit for setting the bit clock phase of each data channel to be in the same half of the phase wheel relative to a master clock. Data inputs D0, D1 . . . DN are shown coupled to circuits 17, 18 and 19 respectively. Each one of circuits 17, 18 and 19 is based on the circuit of FIG. 5 and generates a serial data output from the differential data input together with a bit clock. Further (not shown in FIG. 5), each of circuits 17, 18 and 19 produces a phase signal representative of the phase of its bit clock signal. This signal is derived from the control signals that select the output phase in the phase interpolator 11 for that channel and comprises a digital value representing which of the PLL clocks is selected for interpolation and a second digital value representing the position of the interpolation between them. Channel D1 is designated in this example as the master channel. This is an arbitrary choice and so the other clocks may be ahead of or behind it.

Figure 9A:
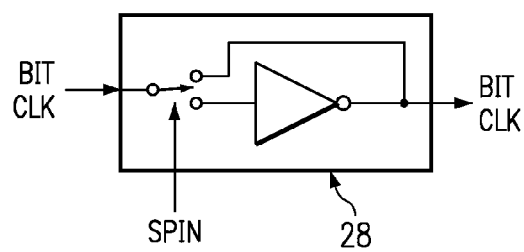
FIG. 9a is a circuit for selectively inverting the phase of a bit clock.

The bit clock phase signal produced by each of circuits 17, 18 and 19 is passed to a central controller 16. That controller 16 compares the phase of each bit clock with the phase of the master bit clock. If the phase difference between a bit clock and the master clock is greater than 90° such that the bit clock is in the wrong half of the phase wheel a spin signal for that bit clock is generated. (Since the phase of a clock is represented by digital values (a pair of them as mentioned above), a combinatorial logic circuit is provided that calculates whether the difference is more than 90°, for example a phase comparator as described below in the second embodiment.) When any one of circuits 17, 18 or 19 receives a spin command, that circuit forces the phase of the bit clock of that channel to be changed by 180°. This is done preferably by switching an inverter in or out of the path of the bit clock signal. A deglitching switch is provided to ensure that the inverter does not introduce extra edges in the bit clock signal. The deglitching switch and inverter combination 28 is shown schematically in FIG. 9a and would be inserted at point I in FIGS. 5 and 7 into the bit clock path—i.e. before the clock signal is used to control the sampling of the data steam with serial to parallel converter 11.

Figure 10:
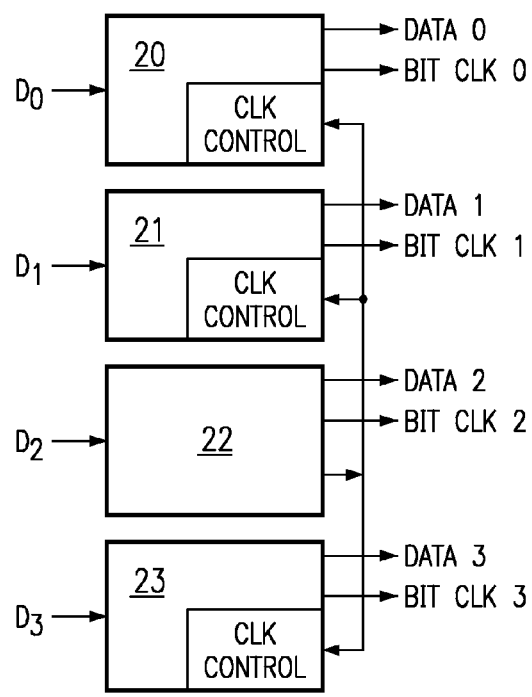
FIG. 10 shows a second circuit in accordance with the invention for setting the bit clocks of multiple channels.

A second embodiment of the invention is shown in FIG. 10. In FIG. 10 data inputs D0, D1, D2 and D3 are shown coupled to circuits 20, 21, 22 and 23 respectively. Each one of circuits 20, 21, 22 and 23 is based on the circuit of FIG. 5 and generates a serial data output, from its differential data input, together with a bit clock. Further each of circuits 20, 21 and 23 includes a clock control circuit which receives a signal representing the phase of the master clock from circuit 22 (data channel D2 being designated the master channel in this case). Each of bit clocks 0, 1 and 3 are adjusted, if necessary, by the clock control circuits of the appropriate data channel as now discussed in relation to FIG. 11.

Figure 11:
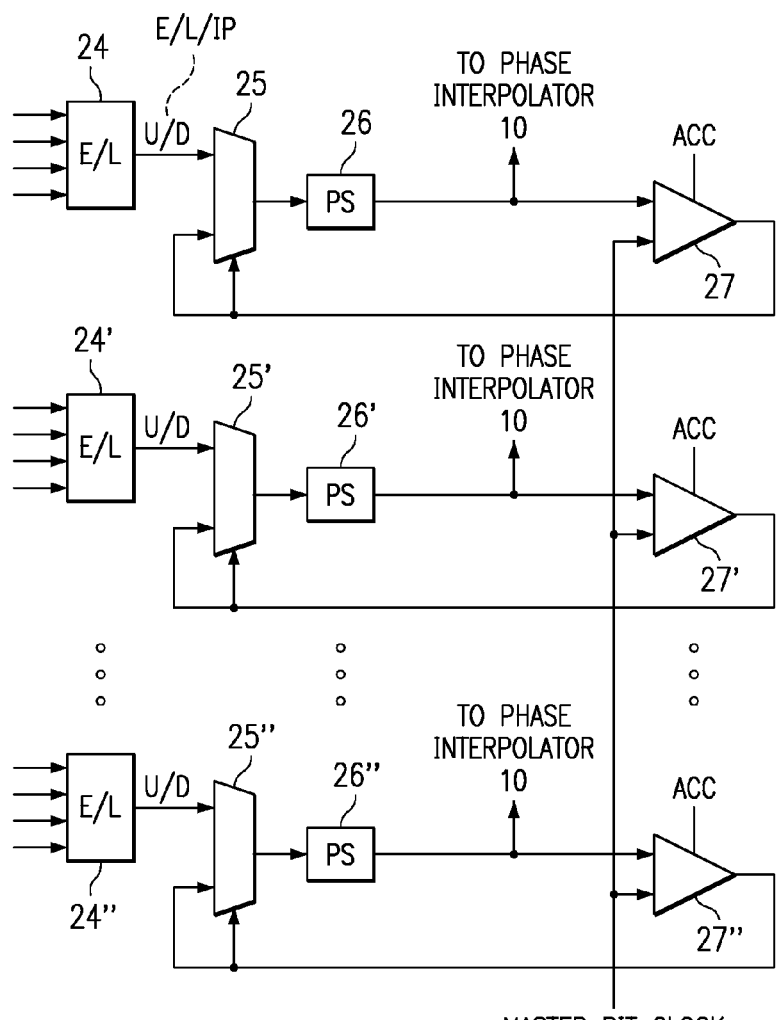
FIG. 11 shows the second circuit in more detail.

FIG. 11 is a block diagram of the clock controllers of circuits 20, 21 and 23 of FIG. 10. Each clock controller comprises an early/late detector 24, 24' and 24", multiplexer 25, 25' and 25" and phase selector 26, 26', 26". The early/late detector 24 and phase selector 26 serve as the phase detector 11 of FIG. 5. Early/late detector 24 has four inputs from which it provides an output indicating whether the bit clock should be advanced (generally if the phase of the data stream is ahead of the phase of the bit clock) or the bit clock should be retarded, or should remain unchanged. Further details of the early/late detector (and its inputs) are given later below.

The output of the early/late detector 24 is coupled to an input of the multiplexer 25. The output of the multiplexer 25 is coupled to the input of phase selector 26. The output of the phase selector 26 controls the phase produced by the phase interpolator 10 of FIG. 5, and accordingly this output comprises both the digital value representing which two phases from the PLL are used by the phase interpolator and the digital value representing the position of the interpolation between them. Phase selector 26 increases or decreases the phase of the bit clock signal as indicated by the signal selected by the multiplexer 25 and therefore moves the bit clock signal around the phase wheel of FIG. 4. Normally the multiplexer 25 selects the output of the early/late detector 24.

The output of phase selector 26 is coupled to the input of a comparator 27. Comparator 27 compares the phase of the bit clock signal with the phase of the master bit clock. The output of comparator 27 indicates whether the phase of the bit clock is in the appropriate sector of the phase wheel i.e. it indicates whether or not that particular bit clock is in the lower or upper half of the phase wheel compared to the master bit clock. The phase signals are as noted elsewhere herein as being digital, comprising both a value indicating which two outputs of the PLL 7 are selected by the phase interpolator 10 for interpolation and a value indicating the position between those of the interpolated clock phase it outputs. The digital values are compared using a combinatorial logic circuit. Various methods of providing these from the truth table of the comparison will be known to the person skilled in the art. Such circuits can be simplified by noting that it is only necessary to take into account the fine interpolation position values if the PLL phase selection values indicate that the phase difference is close to 90°. In the illustrated case of eight PLL phases (where they are consecutively numbered) the PLL phase selection values for that condition differ by two. (While a digital comparison of the phase values is preferred, in alternative embodiments an analogue phase comparator could be used which compares the bit clock waveforms directly.)

If the bit clock is in the lower half of the phase wheel with respect to the master bit clock which is taken to have a phase of 0°, the function of the early/late detector 24 is overridden by the output of comparator 27, which is coupled to both the second input and the control input of multiplexer 25.

When the bit clock signal is in the lower half of the phase wheel (with respect to the master bit clock), the phase selector is forced to move the bit clock signal around in the phase wheel until it reaches an acceptable position (preferably to the phase of the master bit clock as explained below). This is achieved by forcing the phase selector to either advance or retard the bit clock phase on every cycle until the bit clock phase is acceptable. This is done every two byte clock periods, for example, which is faster than the data will move with respect to the reference clock of the PLL in most applications. As will by now be apparent, acceptability has two aspects; that the bit clock phase is in the upper half of the phase wheel with respect to the master phase and that the edges of the bit clock fall close to the centres of the bits of the data stream.

As in the first embodiment of the invention, the bit clock phase may be advanced until the bit clock has been moved by 180°. To do this the comparator maintains control of multiplexer 25 until the move is complete (the phase being advanced by small increments). However, it is preferable to advance the bit clock until the phase of the bit clock is equal to the phase of the master bit clock, the bit clock then being left to move to the phase of the data in that data channel under the control of the respective early/late detector.

Of course, the bit clock could be retarded until the bit clock has been moved by the required amount, rather than advanced.

The early late detector 25, 25', 25", functions as follows. The data stream for the channel is sampled (not illustrated) on both the positive and negative going edges of two clocks: the bit clock for that channel itself and also a clock derived from that which is in quadrature with that clock. This provides four evenly spaced (in time) samples for each cycle of the bit clock. Consecutive sets of four samples are supplied to the early/late detector. When the bit clock is in phase with the data stream the edges of the quadrature clock will fall close to those of the data stream itself. The early/late detector is therefore constructed to compare each sample from an edge of the quadrature clock with its predecessor from the bit clock itself and decide, if they are the same that the bit clock is early and that it is late if they are different. The early/late has inputs for four consecutive samples and makes two such comparisons at a time. If the results agree that the bit clock signal is early or late then it outputs a signal indicating which of those pertains. If they are different it outputs a signal indicating that the bit clock is in phase with its data stream.

Figure 12:
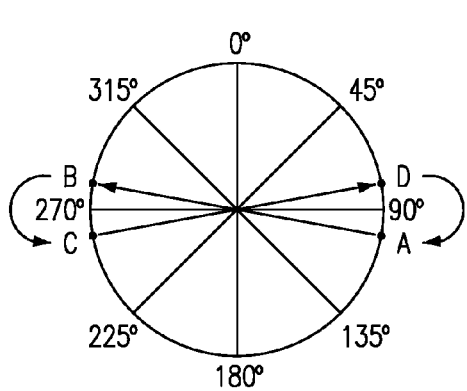
FIG. 12 shows a phase wheel illustrating a particular unstable condition.

The second embodiment of the invention has a number of advantages over the first. First, a potential instability caused by spinning rapidly by 180° is mitigated. This instability is illustrated by FIG. 12. Consider a bit clock with a phase A of just over 90° ahead of the master. In the first embodiment a clock of this phase is advanced rapidly by 180° to phase B. Noise might then cause phase B to move across the boundary of 270° to phase C, whereupon it is advanced instantly by 180° to phase D. There noise may cause it to cross the boundary of 90° ahead of the master to phase A and the cycle could repeat, making the phase unstable.

Further, the second embodiment offers a modular solution, as opposed to a centralised solution. Additional modules can easily be added to the circuit if more data channels are required. This contrasts with the first embodiment in which the central controller would need to be redesigned if further data channels were required. (Clearly, a centralised version of the second embodiment or a distributed modular version of the first embodiment could be designed, however, but these are not considered as advantageous.)

The comparator 27 of each of the clock control circuits of FIG. 11 may optionally be provided with an ACC input. The ACC input provides each of the controllers with a sensitivity or accuracy setting.

Figure 13:
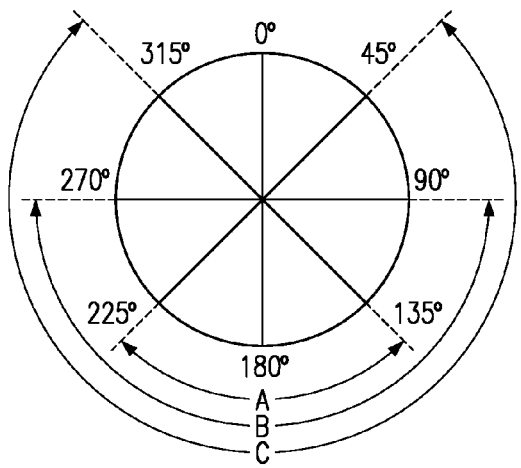
FIG. 13 shows a phase wheel illustrating various ranges of operation.

Refer to FIG. 13; that Figure shows a phase wheel divided into eight segments of 45°. In the examples discussed above, the clock controller has been instructed to spin the phase of the bit clock to the other half of the phase wheel when the phase difference between that bit clock and the master bit clock is at least 90°. Thus the zone in which the bit clock spins is from 90° to 270°, which is zone B in FIG. 12. It is possible to designate other spin zones. For example, zone A in FIG. 12 is a spin zone of between 135° and 225° and zone C is between 45° and 315°. The desired spin zone is set using the ACC input to the comparator 27. The ACC input simply alters the phase differences required to force comparator 27 to instruct the phase selector 26 to spin the bit clock.

The primary purpose of allowing the spin zone to be altered is to provide the data transmission system with a test facility. The frequency at which spin instructions occur can be used as a measure of the spread of the bit clock signals and hence the spread of the incoming data signals. This frequency can be measured by attaching a counter to the conductor carrying the instruction to spin. By varying the spin zone during a test mode, further information about the spread of the phases of the data can be ascertained. The feature can also be used to measure the amount of tolerance in the system. For example, consider the situation where the system is functioning normally and the ACC input sets the spin zone as zone B. If the spin zone is widened, perhaps to zone C, the bit clocks will be forced to spin more often. If the occurrence of clock spins is zero when zone C is used, the user can be confident that when zone B is used (i.e. the normal mode) there is a significant tolerance in the system and bit clock spins should not occur once the initial 180° correction has been made.

Figure 14:
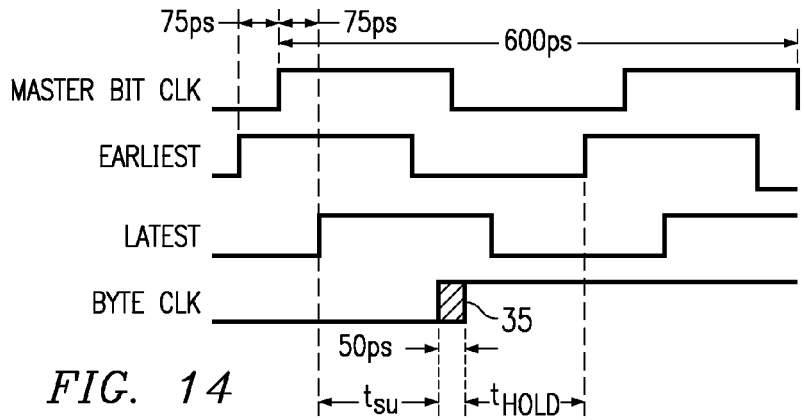
FIG. 14 is a timing diagram illustrating a first method for aligning the word clocks.

The second problem addressed by the present invention is the provision of a single byte clock and the synchronisation of all of the data channels to that byte clock. Note that it is not required immediately to group the bits into the original groups (words or bytes) as they were before transmission but only to group them in arbitrary groups. Sorting them into the correct groups may be done downstream of the present invention but solving that problem is not an objective of the present invention. FIG. 14 is a timing diagram, which demonstrates the difficulty in placing the byte clock.

The first line of the timing diagram of FIG. 14 shows the master bit clock. That bit clock has a period of about 600 ps. The bit clock of each data channel may be advanced or retarded with respect to the bit clock. Assume that the system specification requires that each bit clock is within 45° of the master bit clock on the phase wheel. Thus the allowable spread of data is 75 ps either side of the master bit clock.

Figure 15:
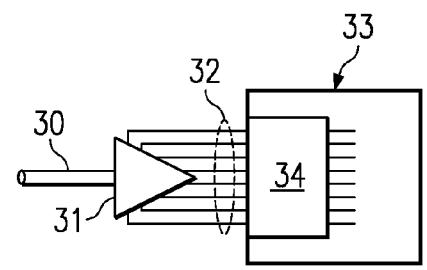
FIG. 15 illustrates a use of the present invention.

This may occur in the optic fibre circuit shown in FIG. 15. Data at 40 Gbs$^{-1}$ on an optic fibre 30 is received by a bipolar integrated circuit receiver 31 which converts it to sixteen parallel data streams 32 at 2.5 Gbs$^{-1}$ which are transmitted a few centimetres over a circuit board to a CMOS integrated circuit 33. Although the sixteen data streams leave the receiver 31 in phase, at those high transmission rates they are not in phase by the time they reach the CMOS circuit 33. (The circuits described herein above may be used to receive the sixteen data streams into the CMOS integrated circuit as diagrammatically illustrated at 34.)

The earliest and latest allowable bit clocks are shown as the second and third lines on the timing diagram of FIG. 14. Clearly the byte clock must be positioned later than the latest possible bit clock in order to latch, into register 14 in the circuit of FIG. 6, the data latched by the latest bit clock. Further, the set up time ($t_{su}$) of that register must not be violated. The set up time of an exemplary register is 200 ps. Thus the byte clock must be positioned at least 200 ps after the latest possible bit clock. That is, at least 275 ps after the master bit clock.

In addition to not violating the set up time of the register 14 with the latest allowable bit clock, the hold time ($T_{HOLD}$) of that register must not be violated by the earliest possible bit clock either. This is because the data latched by the early clock will be changed on the next bit cycle and that data must be latched into register 14 before it changes. The hold time of an exemplary register is 200 ps. Thus the byte clock must be positioned at least 200 ps before the next rising edge of the earliest possible bit clock.

As can be seen in FIG. 14, there is a window 35 of 50 ps during which the byte clock can latch the data from each data channel whilst ensuring that none of the set up or hold times of the data from those data channels are violated.

It is therefore possible to generate a master byte clock from the master bit clock (i.e. the edges of the master byte clock coincide with ones of the master bit clock) and to distribute that master byte clock signal as the byte clock used to trigger register 14 for all data channels. However, the margins are very small.

The byte clock generated can be positioned more closely to the ideal position by making use of the knowledge of the phase of each bit clock. Since the phase of each bit clock is known, the position of each data channel about the phase wheel relative to the master bit clock is known. It is therefore possible to determine from those phases the optimum position to place the byte clock—which in the case of the window described above is, of course, preferably within that window.

Preferably, a representative phase of all the channels is determined and the phase of the byte clock offset a constant amount from that (which may be zero). The representative phase may be, for example, the average of the phases of all the bit clocks (which can be achieved by summing all the phase values and dividing by the number of channels) or by determining which of the phase values are the largest and the smallest and calculating the mid-point between them. These calculations can be achieved using relatively simple combinatorial logic to determine the ideal phase of the byte clock. Various methods of providing a suitable logic circuit will be known to those skilled in the art.

An additional phase interpolator can then be used to generate that byte clock, which byte clock can be distributed around the system including to the registers 14.

Figure 16:
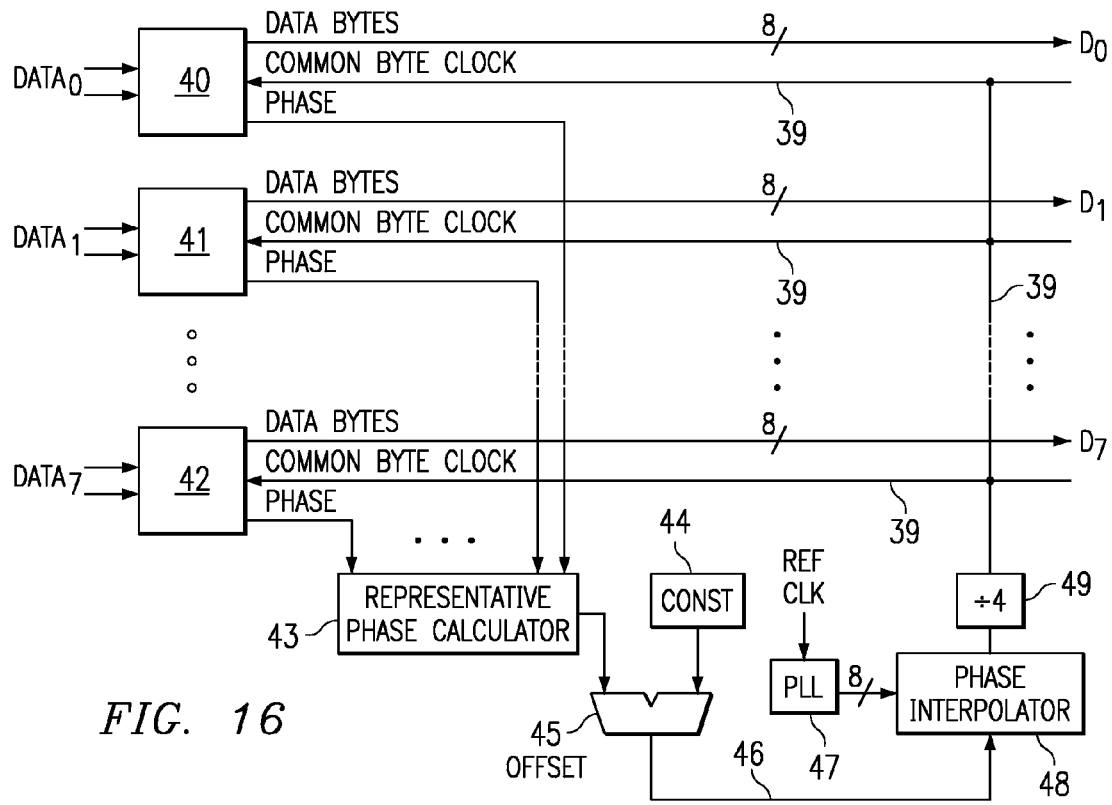
FIG. 16 is a block diagram of a first embodiment circuit for aligning the word clocks.

FIG. 16 is a block diagram of the circuit for producing the common byte clock 39. In FIG. 16 channel sections 40, 41 and 42 are constructed like those of FIG. 7. Preferably in those channel sections measures are taken like those described above to avoid the anti-phase bit clock problem. Each channel section produces 8 bit data bytes (other word lengths are possible) from the register 14 (see FIGS. 6 and 7) which is clocked not from its own byte clock (produced by divider 15) but from the common byte clock 39 (FIG. 16). Alternatively register 14 can be clocked according to the byte clock of its channel and another register be provided to latch the data from register 14 at times defined by the common byte clock.

The remainder of the circuit of FIG. 16 generates the common byte clock according to the method described above. Representative phase calculator 43 is connected to receive the digital phase values from the phase detector 9 (FIG. 7) of each of the channel sections 40, 41 42 (in particular from phase selector 26 in the case of the circuit of FIG. 11) and produces from those the representative phase. A constant value 44 is added with offset adder 45 to produce a digital byte clock phase value 46, the constant being selected to give the optimum phase for the byte clock within the window described above. This is used by the common PLL 47 and an extra phase interpolator 48 to provide a clock signal with the same period as the bit clocks which is then divided by divider 49 to provide the common byte clock signal 39, which is passed back to the channel sections to clock the registers 14 (FIG. 7). As has been noted above it is not a goal of the present invention to provide bytes or word with the original boundaries. Therefore the initialisation of the divider 49 is arbitrary.

Although an improvement on generating the byte clock from the master bit clock, the provision of an additional phase interpolator is expensive and the requirement to bring all of the channels' phase information to a central controller gives rise to a solution that is not modular, the addition of further channels requiring the circuit to be redesigned.

Further, centralisation means that the byte clock has to be distributed around the system. With such a narrow window of time in which the byte clock can be positioned, the time delay introduced by distributing the clock over a metal conductor makes both solutions unattractive for circuits with more than a small number of data channels or that have data streams that are close to each other in phase.

The present invention proposes therefore the following alternative embodiment. In this embodiment the local byte clocks are synchronised to a master channel (preferably in daisy-chain fashion, although this is not essential). One channel is designated a master channel and the byte, or word, clock for that master channel is derived as is done in the circuit of FIG. 7 by dividing the bit clock for that channel. For example, where there are data bits at both the rising and falling edges of the bit clock and register 14 holds an eight bit byte, the byte clock is produced for the master channel by dividing the bit clock for that channel with a divide-by-four counter.

Figure 17:
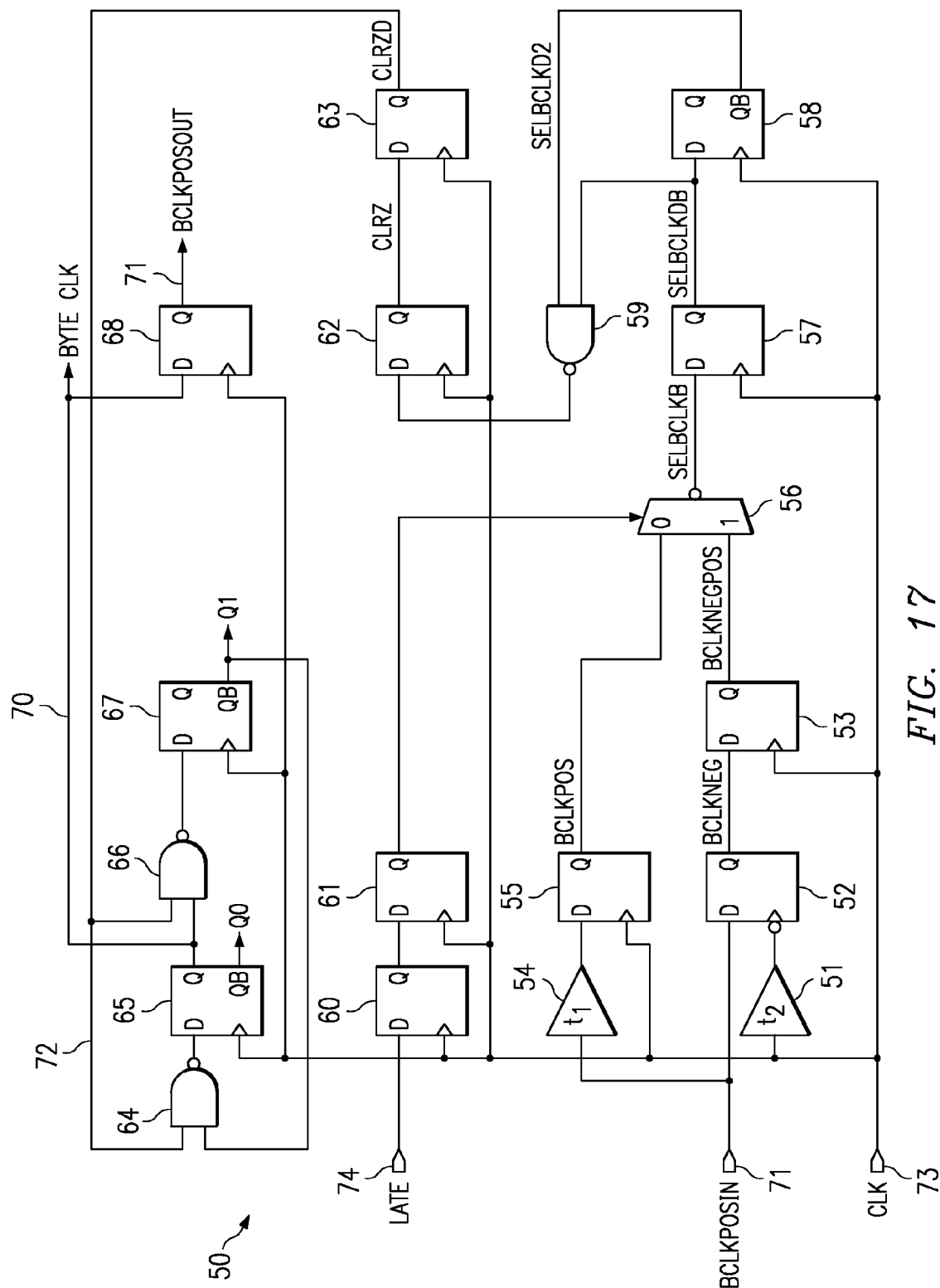
FIG. 17 is a clock alignment circuit suitable for use in a second circuit for aligning the word clocks.

The remaining channels each have a respective byte clock alignment circuit 50 as shown in FIG. 17. A first one of the channels (preferably one physically neighbouring the master to reduce the length of the transmission path) receives an input of the byte clock from the master channel and outputs its byte clock to its other neighbour, which in turn outputs its byte clock to its neighbour and so on as shown in FIG. 18.

Figure 19:
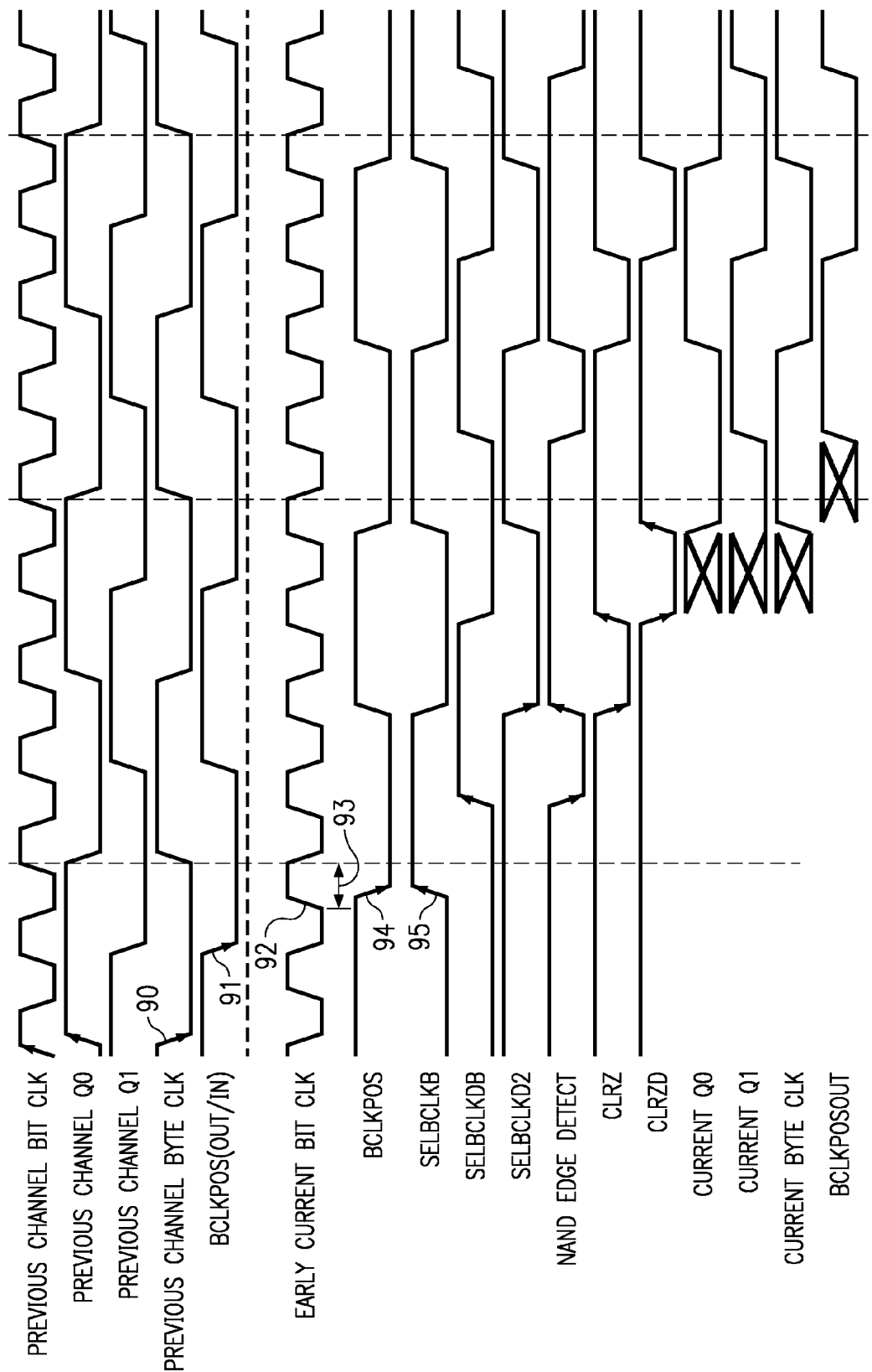
FIG. 19 is a timing diagram for the operation of the circuit of FIG. 17 in the case of an early bit clock.
Figure 20:
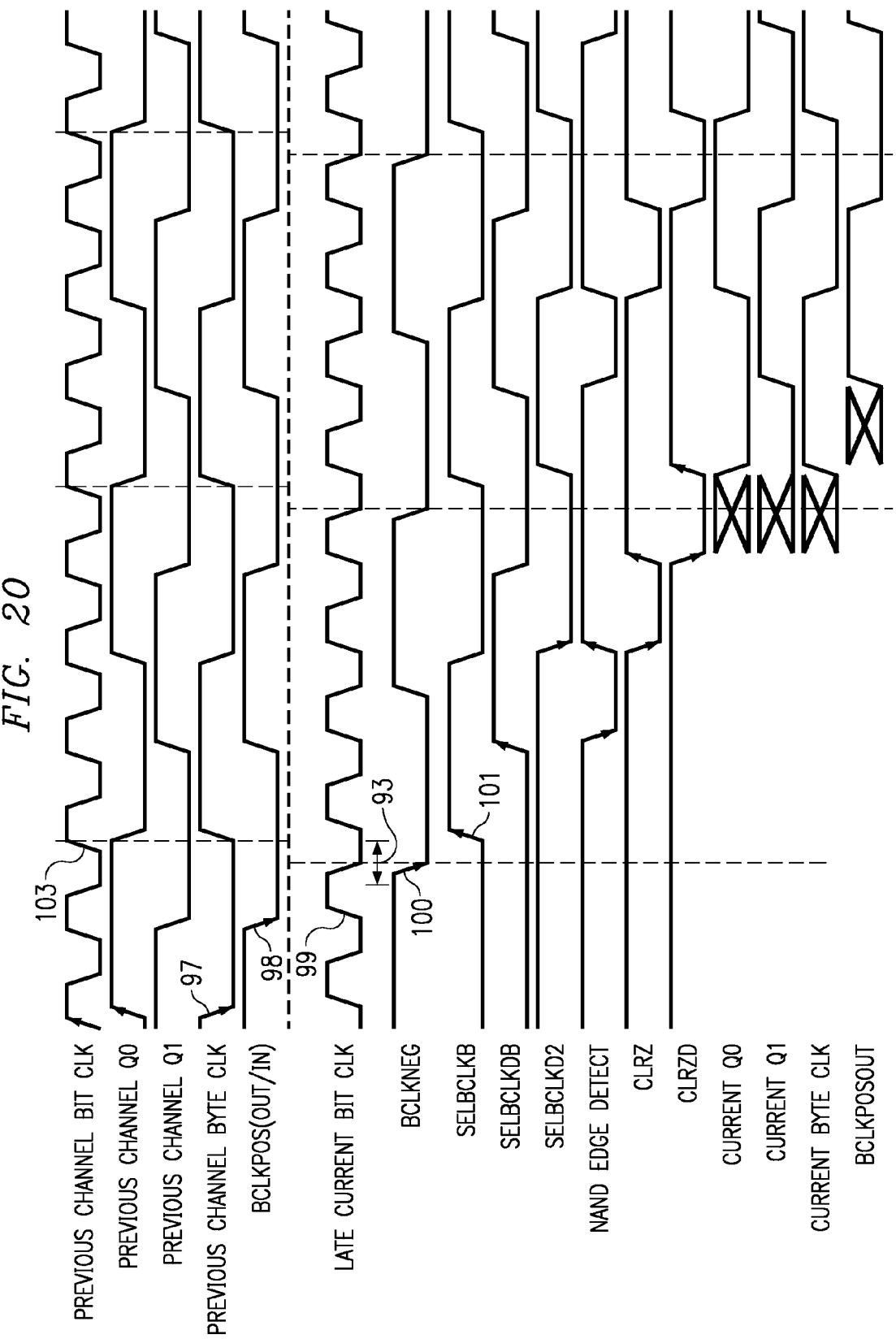
FIG. 20 is a timing diagram for the operation of the circuit of FIG. 17 in the case of a late bit clock.

The circuit 50 of FIG. 17 is now described in detail. FIGS. 19 and 20 are timing diagrams for the circuit 50. The circuit 50 has a divider comprising latches 65 and 67 and NAND gates 64 and 66. The Q output of the first latch 65 is connected to an input of NAND gate 66, the output of which is connected to the D input of latch 67. The inverted output QB of the second latch is connected to an input to the NAND gate 64, the output of which is connected to the D input of latch 65. The other input of both those NAND gates is connected to receive a CLRZD signal 72, which is normally high. The clock input of the latches 65 and 67, like all the other latches in FIG. 17 (except latch 52), is connected to the bit clock signal for that channel 73. With CLRZD 72 high, the divider produces, from the Q output of latch 65, the byte clock 70 for the channel which therefore has its rising edges aligned to those of the bit clock for the current channel (in fact very slightly delayed therefrom owing to the propagation delay of latch 65) as shown in FIG. 19.

The remainder of the circuit of FIG. 17 is designed to provide a negative pulse in the CLRZD signal 72 that so resets the divider that the byte clock for a channel is aligned to that positive going edge of its bit clock that is nearest to that positive going edge of the bit clock of the previous channel to which the byte clock of the previous channel is aligned.

Figure 18:
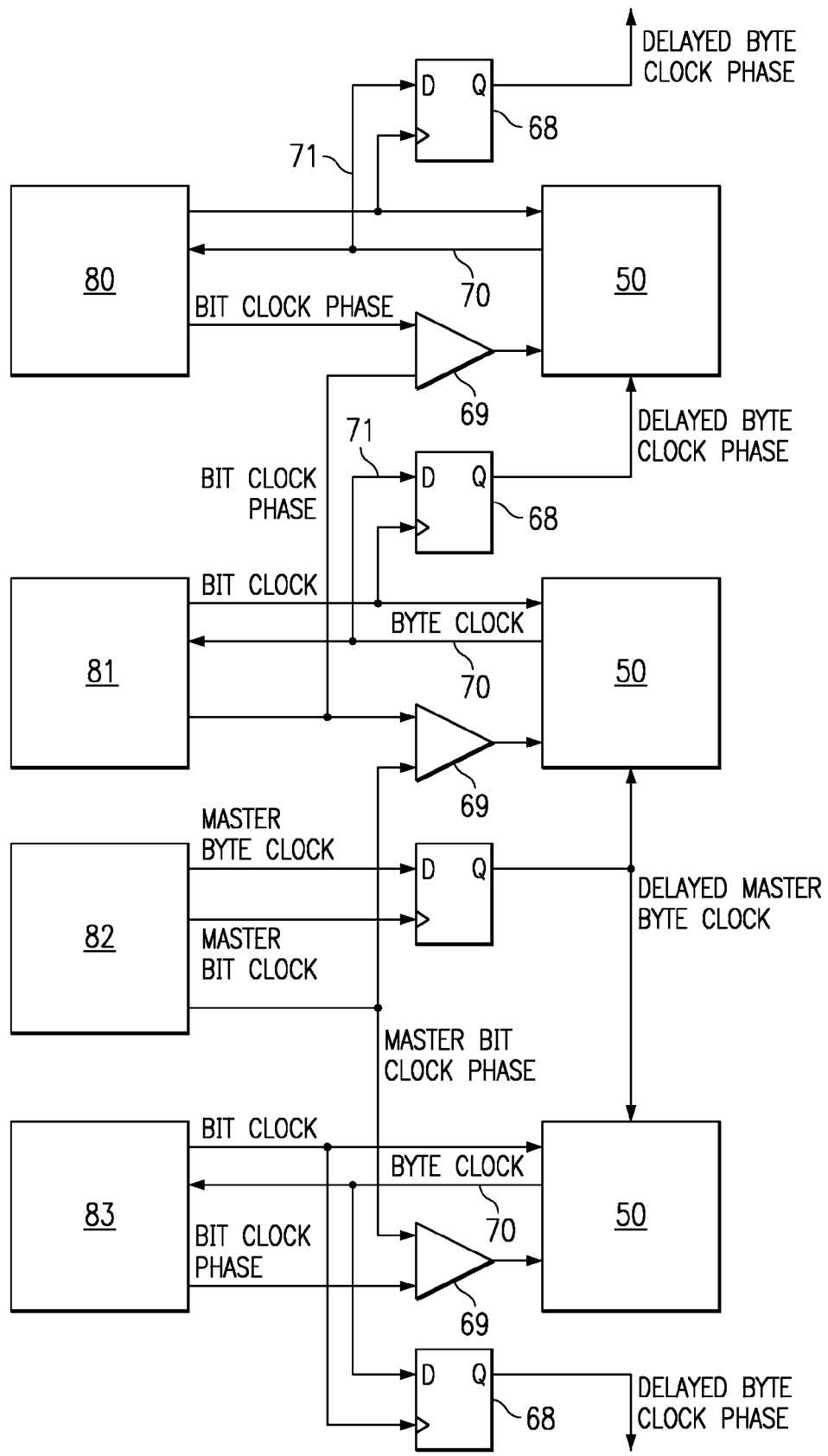
FIG. 18 is a block diagram of the second circuit for aligning the word clocks.

The circuit of FIG. 17 takes as its input a delayed version 71 of the byte clock from the circuit of FIG. 18 for the previous channel (the delay being introduced by latch 68. This signal is latched into the circuit in two ways. Latch 55 latches the delayed byte clock 71 from the previous channel on the positive edges of the bit clock 73 of the current channel, and latch 52 latches that signal on the negative going edge of the bit clock signal 73 of the present channel. Latch 53 re-times the signal produced by latch 52 to the next positive edge of the bit clock signal 73 of the current channel. Delay circuits 54 and 51 are provided respectively at the D input of latch 55 and the clock input of latch 52 to provide small timing adjustments to tune the window of correct operation to be centred at 0 offset with the margin of error in the late signal 74 (see below) taken into account.

Multiplexer 56 is used to select for further processing between those latched versions of the byte clock 71 from the previous channel. The selection is made in accordance with a late signal 74 (FIG. 18), which is generated by a phase comparator 69, an arithmetic combinatorial logic circuit, which compares the phase value of the phase selector for the current channel with that for the previous channel. (The value of the phase signal compared comprises both the gross selection value which selects the output of the phase lock loop and the fine selection value which controls the phase interpolator—see FIG. 7, for example.) The late signal 74 is high if the bit clock edges for the current channel occur later than those of the previous channel. The present channel is signalled as late if the phase of its bit clock is less than 180° behind that of the previous channel and as early if it is less than 180° ahead of that of the previous channel.

With the late signal high, the version of the byte clock selected is that latched by latches 52 and 53, otherwise it is that latched by latch 55. The selected latched byte clock is then passed in series through latches 57 and 58, the Q output of latch 57 being connected to the D input of latch 58. NAND gate 59 compares the Q output of latch 57 with the inverted QB of latch 108 and therefore provides a negative pulse whenever there is a negative edge on the selected latched byte clock signal (multiplexer 56 providing an inversion). With two further delays provided by latches 62 and 63, this signal is used to reset the byte clock divider 65, 67, 68. Although, of course, a pulse on CLRZD 72 will recur following each negative going edge of the selected latched byte clock signal, but once that pulse has reset the divider on its first occurrence, the later occurrences fall as the divider is clocked to its reset value.

The reason for selecting between the two latched versions of the byte clock signal from the previous channel (with the multiplexer 56 under the control of the late signal 74) is as follows. FIG. 19 shows the case where the bit clock of the current channel is almost 180° ahead of that of the previous channel. Since the current bit clock is ahead of that of the previous channel, the late signal 74 is low and the multiplexer 56 selects the version of the previous byte clock 71 sampled by latch 55. Latch 68 delays the byte clock of the previous channel by one period of the bit clock. The negative going edge 90 of the byte clock of the previous channel is, of course, therefore delayed by one period of the bit clock to an edge 91. The edge 91 is three bit clock periods after the last positive going edge of the byte clock of the previous channel. Latch 55 will reproduce edge 91 on the next positive going edge 92 of the current bit clock, which of course will be within one bit clock period. In fact since the current bit clock is early and the period of the byte clock is four times that of the bit clock, the next edge the edge 92 of the current bit clock is between a half and a whole bit clock period after edge 91 (or equivalently within a half bit clock period before the relevant positive edge of the bit clock of the previous channel). That range is indicated at 93. In the particular example of the early current bit clock edge position 92, the reproduction of the edge 92 is shown in FIG. 19 at 94. That edge is inverted by multiplexer 56 to form a positive going edge 95 aligned with the first positive going edge 92 of the current bit clock ahead of (i.e. earlier than) the positive going edge of the byte clock of the previous channel.

The output of the multiplexer 56 could be used as the byte clock for the current channel but would be subject to glitches as the late signal 74 changes switching the multiplexer 56 and also is a later signal than one directly from a D-type; the rest of the circuit of FIG. 17 removes that problem and provides a clean version of the byte clock aligned with the output of multiplexer 56 but directly from the output of a D-type.

FIG. 20 shows the case of where the bit clock of the current channel is behind that of the previous channel. In this case the late signal is high and the multiplexer 56 selects the version of the byte clock from the previous channel sampled by latches 52 and 53. A negative edge 97 of the byte clock of the previous channel is delayed for one period of its bit clock by latch 68 of its circuit 50 to an edge 98. This is sampled by latch 52 of the circuit 50 of the present channel on the next negative edge 99 of the bit clock of the present channel to provide an edge 100. That edge is delayed half a bit period by latch 53, which unlike latch 52 is clocked from the positive edges of the bit clock, and is then inverted by multiplexer 56 to provide an edge 101. The circuit then proceeds as before, providing from the divider a byte clock signal synchronised with the output of the multiplexer 56 and having positive edges aligned with the positive edge 102 of the current bit clock signal that falls just after the relevant edge 103 of the bit clock of the previous channel.

Since the current bit clock is late its relevant positive going edge 102 by definition falls after that positive going edge 103 of the bit clock of the previous channel to which the byte clock of the previous channel is aligned. The negative edge 99 before positive edge 102 again falls within the interval 93 of a half to one bit clock period after the negative edge of the delayed byte clock from the previous channel (this time edge 98), which interval again is equivalently stated as the period of half a bit clock period before the relevant edge 103 of the bit clock of the previous channel. Thus it may be seen how the functions of the circuit 50 for the cases of early and late bit clocks may be carried out by the same circuitry after multiplexer 56.

Latches 60 and 61 delay the late signal provided by the phase comparator 69. This is done so the late signal arrives from a register clocked on a synchronous clock region so it is registered twice to reduce the problems of metastability which arise in the first latch.

Although a circuit 50 is for use in the case where there are eight bits to the byte, a similar circuit could be constructed for the case where the bits are grouped under the control of the byte clock into 10 bit bytes, or words, in which case the byte clock has a period five times of the bit clock. Modifications needed are so that the divider produces a byte clock of the appropriate length and to adjust appropriately the delays provided in the circuit by the latches (and possibly the inclusion of the inversion in the multiplexer, which in effect provides a delay).

The solution can be applied to any number of bits in a byte ranging from 2 upwards.

The invention claimed is:

1. A circuit comprising:
    a plurality of data input terminals each for receiving respective serial data signals having the same bit rate,
    bit clock generating means responsive to the serial data signals to provide for each a respective bit clock signal aligned with that data signal and having a period equal to twice the bit period of the data signal,
    bit clock phase adjustment means responsive to the relative phases of the bit clocks to adjust the phases of the bit clocks relative to one another so that they all lie within a common interval of 180° of phase, where 360° of phase represents the period of the bit clock;
    wherein the bit clock phase adjustment means, or each said separate bit clock phase adjustment means, comprises a phase comparator for performing the said comparison of the phases of the bit clocks.

2. A circuit as claimed in claim 1 wherein the plurality of bit clocks comprise a master one, the others of the plurality being slave ones, and the bit clock phase adjustment means is arranged to compare the master bit clock signal with the phase of the other or each of the other, slave, bit clock signals and to adjust the phase of the or each slave bit clock signal if it falls outside the common interval of 180° of phase.

3. A circuit as claimed in claim 2 wherein the adjustment means is such that the common interval is defined with respect to the phase of the master bit clock.

4. A circuit as claimed in claim 3 wherein the common interval is centered on the phase of the master bit clock.

5. A circuit as claimed in claim 1 wherein the phase adjustment means is arranged to adjust the phase of a bit clock signal that is outside the common interval to a phase that is defined with respect to a master one of the bit clock signals and that is within the common interval.

6. A circuit as claimed in claim 5, wherein the phase adjustment means is arranged to adjust the phase of a bit clock signal that is outside the common interval to be equal to the phase of the master bit clock signal.

7. A circuit as claimed in claim 6 wherein the bit clock generating means is arranged to re-align a bit clock signal to its associated serial data signal after the said adjustment of the phase.

8. A circuit as claimed in claim 1, wherein the phase adjustment means is arranged to adjust, by 180°, the phase of a bit clock signal outside the common interval.

9. A circuit as claimed in claim 8 comprising an inverter connected to be switched in or out of the path of a bit clock signal to perform the said 180° phase adjustment.

10. A circuit as claimed in claim 1 wherein a separate bit clock generating means is provided for each bit clock signal of the plurality and the bit clock phase adjustment means is provided as a centralised unit connected to receive from each separate bit clock generating means a signal representing the phase of its bit clock signal and to send to at least some of the separate bit clock generating means signals indicating that an adjustment of the phase of its bit clock signal is to be made.

11. A circuit as claimed in claim 10 wherein one of the separate bit clock generating means provides a master phase, the centralised bit clock phase adjustment means is arranged to compare each of the phase signals from the other separate bit clock generating means with the master phase, and the centralised bit clock phase adjustment means is connectable to all of the separate bit clock phase adjustment means except the master one to provide them with signals indicating that an adjustment of phase is to be made.

12. A circuit as claimed in claim 10 wherein the separate bit clock generating means, or the said at least some of those, each comprise an inverter connected to be switched in or out of the path of the bit clock signal to perform a 180° phase adjustment on its bits clock signal.

13. A circuit as claimed in claim 1 wherein a separate bit clock generation means is provided for each bit clock signal of the plurality and a separate slave bit clock phase adjustment means is provided for all but a master one of the bit clock signals of the plurality, the slave bit clock phase adjustment means each being connected to receive the phase signal from the bit clock generation means of the master bit clock signal and being responsive thereto to adjust the phase of its bit clock signal.

14. A circuit as claimed in claim 1 wherein the phase comparator comprises a digital circuit responsive to digital signals representing the phases of the bit clock signals to perform the said comparing the phases of the bit clocks.

15. A circuit as claimed in claim 1 wherein the bit clock generating means, or each said bit clock generating means comprises a phase selector operative to store a digital phase value representing the phase of a bit clock signal, means responsive to that digital phase value to generate a bit clock signal of a corresponding phase.

16. A circuit as claimed in claim 15 wherein the bit clock generating means comprises an early/late detector operative to compare the phases of the bit clock and its associated data signal and to adjust the value stored in the phase selector so as to keep the bit clock in a particular phase relationship with its associated data signal.

17. A circuit as claimed in claim 15, wherein the bit clock phase adjustment means is operative to effect the said adjustment of the phase of the bit clock by adjusting the value in the phase selector.

18. A method receiving a plurality of parallel data signals of the same bit rate comprising:
    generating for each data signal a respective bit clock signal aligned with that data signal and having a period equal to twice the bit period of the data signal,
    adjusting the phases of the bit clocks relative to one another so that they all lie within a common interval of 180° of phase, where 360° of phase represents the period of the bit clock;
    designating one of the said bit clocks as a master bit clock and the others as slave bit clocks,
    comparing the phase of each of the slave bit clocks with that of the master bit clock, and
    in response to that, adjusting each slave bit clock that falls outside said common interval of 180° of phase.

19. A method as claimed in claim 18 wherein the common interval is defined with respect to the phase of the master bit clock.

20. A method as claimed in claim 19 wherein the common interval is centred on the phase of the master bit clock.

21. A method as claimed in claim 18 wherein the adjusting of the phase of a bit clock signal that is outside the common interval is to a phase that is defined with respect to the master bit clock and that is within the common interval.

22. A method as claimed in claim 21 wherein the adjusting of the phase of a bit clock signal that is outside the common interval is to a phase equal to that of the master bit clock.

23. A method as claimed in claim 22 comprising re-aligning a bit clock signal to its respective data signal after the said adjusting of the phase.

24. A method as claimed in claim 18 wherein the adjusting of a bit clock signal outside the common interval is by 180°.

25. A method as claimed in claim 18, wherein the generating and adjusting of the bit clock signals take place in separate units associated with the respective bit clock signals and the comparing is performed for all of the bit clock signals in a centralised unit that signals the separate units when to adjust the phase of the bit clock signals.

26. A method as claimed in claim 18, wherein the generating and adjusting of the bit clock signals takes place in separate units for each and the said comparing for a bit clock signal is performed in its unit also, each unit receiving the master bit clock signal for that comparing.

* * * * *